(12) United States Patent
Woytowitz

(10) Patent No.: US 7,613,547 B1
(45) Date of Patent: Nov. 3, 2009

(54) MODULAR IRRIGATION CONTROLLER WITH SEPARATE FIELD VALVE LINE WIRING TERMINALS

(75) Inventor: Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 65 days.

(21) Appl. No.: 11/860,774

(22) Filed: Sep. 25, 2007

Related U.S. Application Data

(63) Continuation of application No. 11/191,858, filed on Jul. 28, 2005, now Pat. No. 7,289,886.

(51) Int. Cl.
*G06F 19/00* (2006.01)

(52) U.S. Cl. .................................... 700/284; 239/69
(58) Field of Classification Search ............... 700/284, 700/282, 19; 239/69, 63, 79
See application file for complete search history.

(56) References Cited

U.S. PATENT DOCUMENTS

| | | | | |
|---|---|---|---|---|
| 3,653,595 | A | 4/1972 | Greengard, Jr. et al. | 239/70 |
| 4,176,395 | A | 11/1979 | Evelyn-veere et al. | 264/420 |
| 4,209,131 | A | 6/1980 | Barash et al. | 239/68 |
| 4,760,547 | A * | 7/1988 | Duxbury | 700/284 |
| 5,251,153 | A * | 10/1993 | Nielsen et al. | 700/284 |
| 5,262,936 | A | 11/1993 | Farris et al. | 364/140 |
| 5,333,785 | A | 8/1994 | Dodds et al. | 239/69 |
| 5,414,618 | A | 5/1995 | Mock et al. | 364/140 |
| 5,479,338 | A | 12/1995 | Ericksen et al. | 364/145 |
| 5,839,658 | A | 11/1998 | Sarver | 239/1 |
| 5,956,248 | A | 9/1999 | Williams et al. | 364/145 |
| 6,459,959 | B1 | 10/2002 | Williams et al. | 700/284 |
| 6,721,630 | B1 | 4/2004 | Woytowitz | 700/284 |
| 6,842,667 | B2 | 1/2005 | Beutler et al. | 700/284 |
| 7,243,005 | B1 * | 7/2007 | Beutler et al. | 700/284 |
| 7,257,465 | B2 * | 8/2007 | Perez et al. | 700/284 |
| 2005/0038529 | A1 * | 2/2005 | Perez et al. | 700/19 |
| 2005/0267641 | A1 | 12/2005 | Nickerson et al. | 700/284 |
| 2006/0030971 | A1 | 2/2006 | Nelson et al. | 700/284 |
| 2007/0156290 | A1 | 7/2007 | Froman et al. | 700/284 |
| 2007/0208462 | A1 | 9/2007 | Kah | 700/284 |
| 2008/0058964 | A1 * | 3/2008 | Nickerson et al. | 700/19 |
| 2008/0125917 | A1 * | 5/2008 | Walker et al. | 700/284 |
| 2008/0319585 | A1 * | 12/2008 | Nickerson et al. | 700/284 |

* cited by examiner

*Primary Examiner*—Kidest Bahta
(74) *Attorney, Agent, or Firm*—Michael H. Jester

(57) ABSTRACT

A modular irrigation controller includes a processor capable of executing a stored watering program and controlling a plurality of removable station modules in accordance with the watering program. Each station module includes a station module circuit for opening and closing a plurality of valves. A plurality of connectors can mate each mate to establish a communications link between the station modules and the processor. A plurality of terminals are each connectable with a corresponding one of a plurality of field valve lines from the valves. The terminals are mounted separate from the station modules and are connected to the connectors. This allows the irrigation controller to have a more compact design, provides connection terminals for spare field valve lines, and eliminates malfunctions due to erroneous re-connection of field valve lines during station module replacement.

19 Claims, 4 Drawing Sheets

MODULAR IRRIGATION CONTROLLER WITH SEPARATE FIELD VALVE LINE WIRING TERMINALS

CROSS REFERENCE TO RELATED APPLICATION

This application is a continuation of U.S. patent application Ser. No. 11/191,858, filed Jul. 28, 2005, which is pending as of the filing of this application.

FIELD OF THE INVENTION

The present invention relates to electronic irrigation controllers that control valves which supply water to sprinklers, and more particularly, to modular irrigation controllers that can be expanded after initial installation to control more zones or stations.

BACKGROUND OF THE INVENTION

In many parts of the world due to inadequate rainfall it is necessary at some times during the year to artificially water turf and landscaping. Residential and commercial irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a zone or station. A modern electronic irrigation controller typically includes a microprocessor and separate memory, or a micro-computer with on-chip memory, that stores and executes one or more watering programs. The watering programs can be pre-programmed by the user via push button and/or rotary controls. The controller usually has an LCD or other display to facilitate programming by the user. The microprocessor controls the solenoid valves via suitable drivers and switching devices. The valves are opened and closed by the microprocessor in accordance with the pre-programmed run and cycle times for each of the stations. The goal is to uniformly distribute the optimum amount of water over a given area.

Modular expandable irrigation controllers have gained increasing popularity in both residential and commercial landscape environments. In these controllers, the base portion of the system contains the microprocessor and user actuated controls. Each station is then controlled by a corresponding station module which comprises a plastic housing that encloses and supports a station module circuit, as well as wire connection terminals for connecting wires to a plurality of solenoid actuated valves. Typically each station module can independently control more than one solenoid actuated valve, i.e., station. The station modules contain pins, sockets, card edge connectors or some other standard form of electro-mechanical connectors for allowing them to be inserted into slots or receptacles in either the housing that contains the microprocessor or a separate back panel hinged to the microprocessor housing. The advantage of this configuration is that the controller need only be equipped with the minimum number of station modules that can control the total number of stations. Thus, for example, an irrigation system may have only three zones, requiring only a single station module, while another may have twelve stations which might require four station modules. Considerable cost savings are thus achieved. Moreover, if an irrigation system expands after initial installation because the landscaping has increased, additional station modules can be added.

A modular irrigation controller is typically connected to each solenoid actuated valve by a dedicated field valve line, for example, twelve gauge wire. A common return line is connected between all of the valves and the controller. Triacs in the station module circuit are used to switch a twenty-four volt AC signal ON and OFF each relative to each of the field valve lines. In conventional modular irrigation controllers, the stripped ends of the field valve lines are connected to screw type terminals or lever type terminals on the station modules themselves.

One of the drawbacks of conventional modular irrigation controllers is that they are usually larger than non-modular irrigation controllers capable of controlling the same number of stations. Since all of the field valve lines must be separately connected to corresponding modules, the modules must be oriented so that their terminals are all readily accessible for connection of the field valve lines. This requirement in turn prevents the modules from being stacked to reduce the overall size of the irrigation controller.

Another downside to conventional modular irrigation controllers involves the installation and connection of the field valve lines. Often contractors run spare field valve lines for later expansion of the irrigation system, but since the extra station modules will not be inserted into the controller until a later date, there are no terminals for the extra field valve lines. This can lead to misconnection of extra field valve lines at a later date. If not properly labeled, it can be tedious to determine the zones that the extra field valve lines control. Moreover if the extra field valve lines that are unconnected are stripped of insulation, they can cause shorts.

Another problem with conventional modular expandable irrigation controllers arises when a station module is damaged and therefore must be removed and replaced. The station module that needs to be removed is sometimes "covered" with existing field valve lines that must be displaced. Sliding or other movement required to remove a station module may be impaired by the field valve lines attached to the defective station module or adjacent station modules. Moreover, quite often the installer mistakenly re-connects the field valve lines to the wrong terminals of the new station module so that the different stations that are supposed to be controlled by the module either do not run at all, or they do not run with the correct cycle and run times.

SUMMARY OF THE INVENTION

The present invention provides a modular irrigation controller in which a plurality of terminals are mounted separate from the station modules and connect the modules with a plurality of field valve lines from a plurality of valves. If a defective station module must be replaced, it is simply unplugged and new station module is plugged in. No disconnection and re-connection of the field valve lines is required. This allows the irrigation controller to have a more compact design, provides connection terminals for spare field valve lines, and eliminates malfunctions due to erroneous re-connection of field valve lines during station module replacement.

BRIEF DESCRIPTION OF THE DRAWINGS

Throughout the drawing figures like reference numerals refer to like parts.

DETAILED DESCRIPTION

The entire disclosures of the following patents and applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; pending U.S. patent application Ser. No. 10/848,394 filed May 17, 2004 also of Peter J. Woytowitz entitled ISOLATED MODULAR EXPANDABLE IRRIGATION CONTROLLER; pending U.S. patent application Ser. No. 10/883,283 filed Jun. 30, 2004 also of Peter J. Woytowiz entitled HYBRID MODULAR/DECODER IRRIGATION CONTROLLER; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; and pending U.S. patent application Ser. No. 11/045,527 filed Jan. 28, 2005 also of Peter J. Woytowitz entitled DISTRIBUTED ARCHITECTURE IRRIGATION CONTROLLER. The aforementioned patents and applications are all assigned to Hunter Industries, Inc., the assignee of the subject application.

Figure 1:
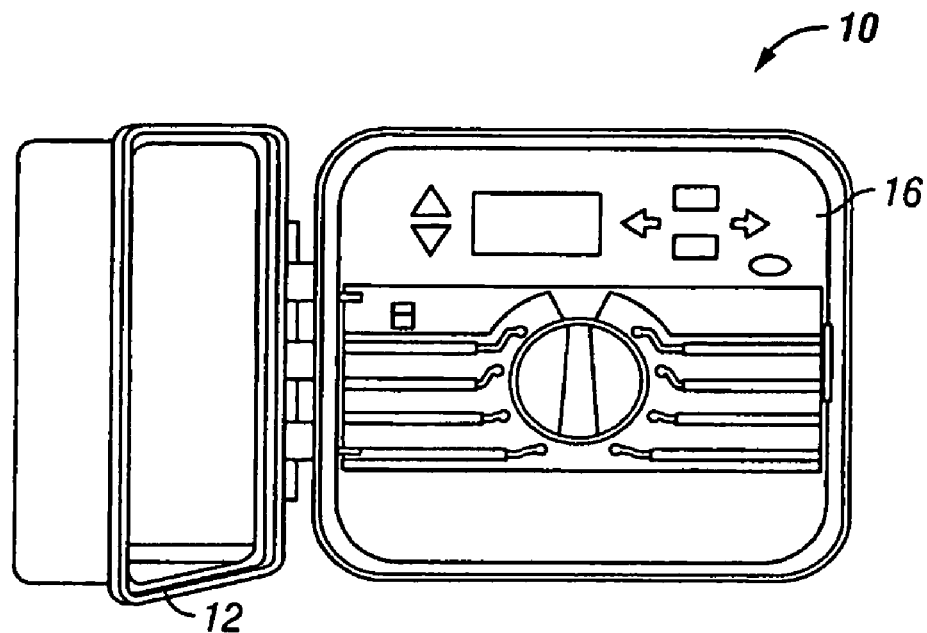
FIG. 1 illustrates an embodiment of the irrigation controller of the present invention with its front door open to reveal its removable face pack.
Figure 2:
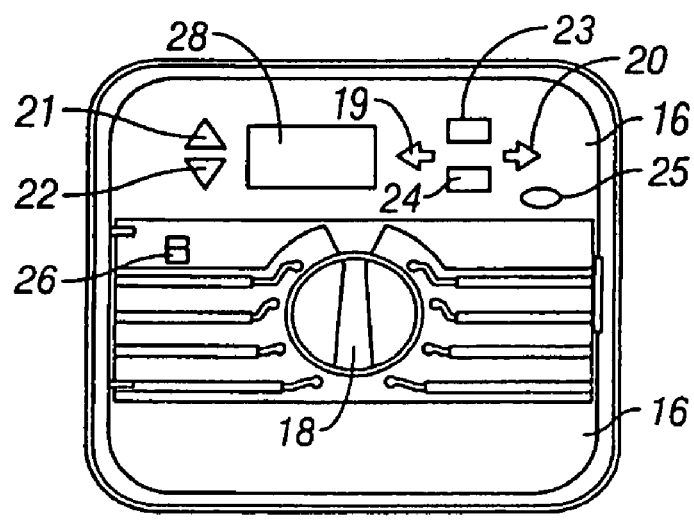
FIG. 2 is an enlarged plan view of the removable face pack.
Figure 3:
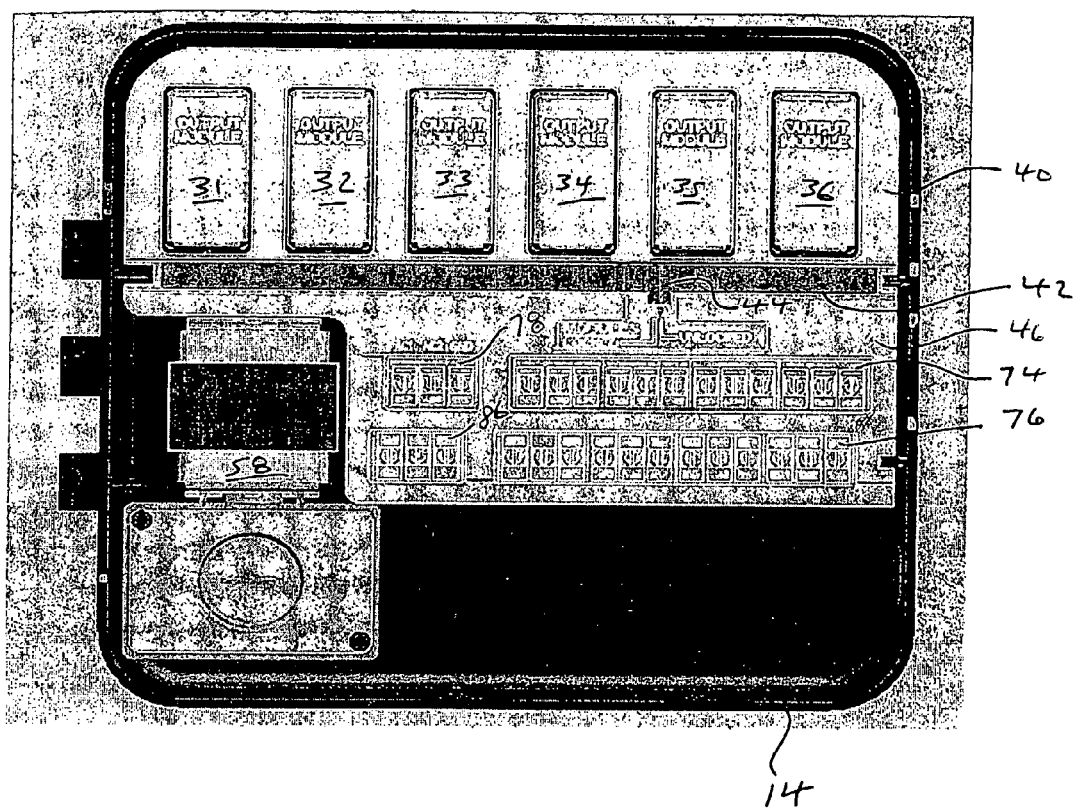
FIG. 3 is a still further enlarged plan view of components of the irrigation controller of FIGS. 1 and 2 that are mounted in its back panel, which are accessible after the face pack has been removed.

Referring to FIGS. 1 and 2, an irrigation controller 10 in accordance with an embodiment of the present invention includes a wall-mountable plastic structure including a generally box-shaped front door 12 hinged along one vertical edge to a generally box-shaped back panel 14 (FIG. 3). A generally rectangular face pack 16 (FIG. 2) is removably mounted over the back panel 14 and is normally concealed by the front door 12 when not being accessed for programming. The face pack 16 has a plurality of manually actuable controls including a rotary dial switch 18 and push button switches 19, 20, 21, 22, 23, 24 and 25 as well as slide switch 26, which can be manipulated in conjunction with numbers, words or graphic symbols indicated on a liquid crystal display 28 for entering or selecting a watering program as is well known in the art of electronic irrigation controllers. Custom watering programs can be created by the user by manipulating the rotary dial switch 18 and selected ones of the push button switches 19, 20, 21, 22, 23, 24 and 25. Alternatively, existing pre-programmed watering programs can be selected, such as watering all zones every other day for five minutes per zone.

Figure 4:
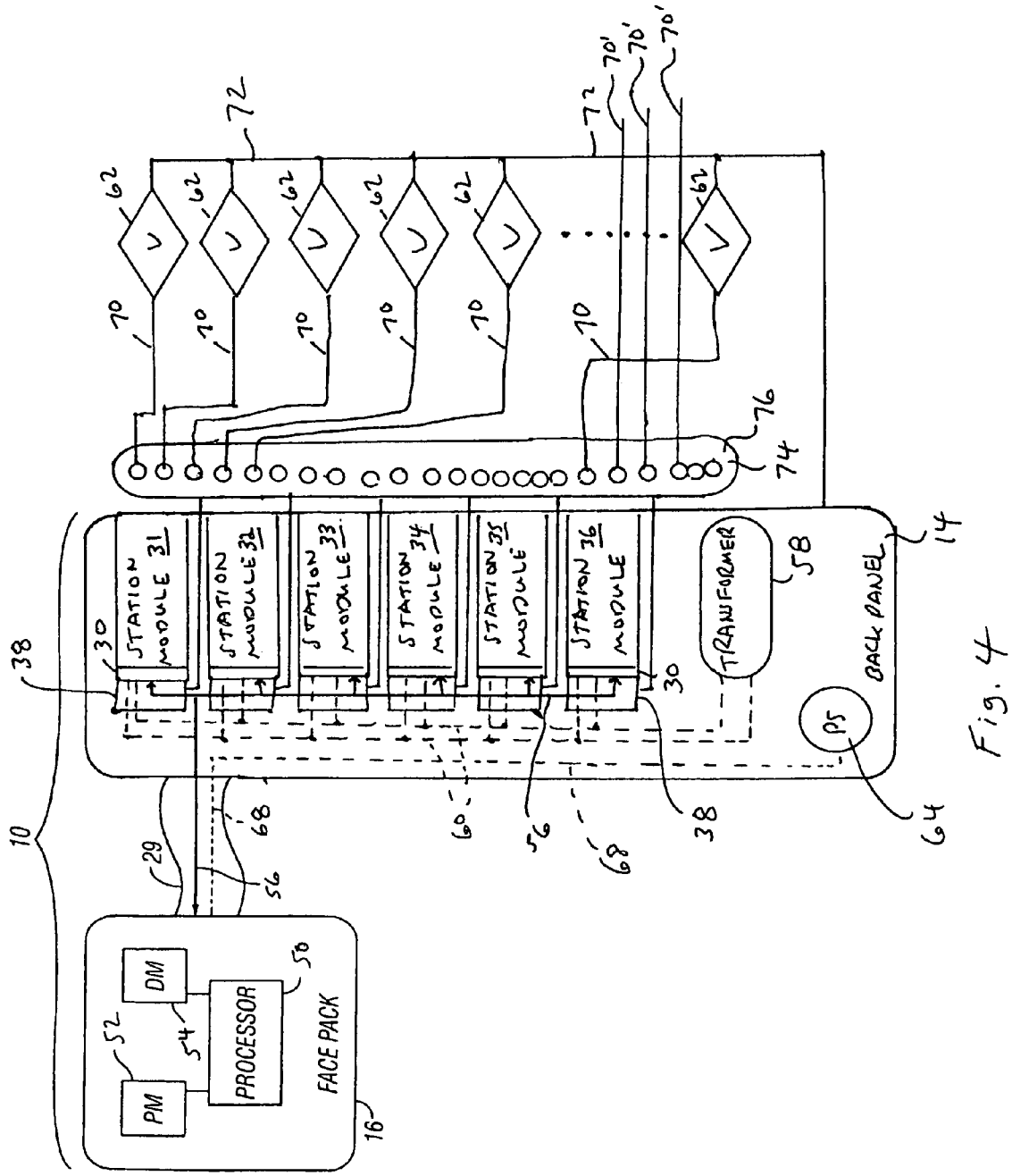
FIG. 4 is a block diagram of an irrigation system including the irrigation controller of FIGS. 1-3.

The face pack 16 (FIGS. 1 and 2) supports a main circuit board assembly (not illustrated) with a processor, hereafter described, for executing and implementing a stored watering program. An electrical connection is made between the face pack 16 and the components in the back panel 14 through a ribbon cable 29 (FIG. 4). The circuitry inside the face pack 16 can be powered by a battery to allow a person to remove the face pack 16, un-plug the ribbon cable 29, and walk around the lawn, garden area or golf course while entering a watering program or altering a pre-existing watering program. The stored watering program can be a complex set of run time and cycle programs, or a portion thereof, such as a simple five minute cycle for a single station.

Female multi-pin electrical connectors 30 (FIG. 4) mounted in the underside walls of six removable rectangular station modules 31-36 (FIG. 3) receive corresponding male multi-pin electrical connectors 38 (FIG. 4). The modules 31-36 are received in side-by-side fashion in outwardly opening rectangular receptacles formed in a plastic support structure 40 mounted within the back panel 14 (FIG. 3). The male multi-pin connectors 38 are mounted in the receptacles. The back panel 14 is a separate housing from the face pack 16 that encloses the processor, the functions of which are hereafter described in greater detail. The module 31 may be a master module that interfaces with a pump and sensor (not illustrated). A locking bar 42 can be manually slid left and right in FIG. 3 between locked and unlocked positions to secure and un-secure the station modules 31-36 in their receptacles as disclosed in the aforementioned U.S. Pat. No. 6,842,667. A raised projection 44 on the locking bar 42 is grasped between the thumb and index finger to slide the locking bar 42. The raised projection 44 also serves as a position indicator that aligns with MODULES LOCKED indicia and UNLOCKED indica formed on the upper surface of another plastic support structure 46 mounted inside back panel 14.

FIG. 4 is a block diagram of an irrigation system that includes the controller 10. A processor 50 mounted in the face pack 16 executes a selected watering program stored in a program memory (PM) 52 using a data memory (DM) 54. The PM 52 may be provided as a read only memory (ROM), a flash memory, or other suitable permanent or semi-permanent micro-electronic memory. The DM 54 is preferably a random access memory (RAM). The processor 50 may comprise a microprocessor that uses separate memory, or a micro-computer with on-chip memory that serves the same functions as the PM 52 and DM 54. The manually actuable controls and the display of the controller 10 are not illustrated in FIG. 4 for the sake of simplicity. They are interfaced with the processor 50 in the usual fashion. The processor 50 is connected through suitable input/output (I/O) devices (not illustrated), an electro-optic isolator (not illustrated) and a bus 56 that is routed through the ribbon cable 29 to the station modules 31-36 in the back panel 14.

The processor 50 (FIG. 4) controls the station modules 31-36. Serial or multiplexed communication is enabled over the bus 56 so that all of the information as to which stations or zones should be turned ON and OFF at any given time is present at each receptacle. A twenty-four volt AC power signal from a transformer 58 plugged into a wall outlet is supplied to each of the station modules 31-36 over a pair of lines 60. The twenty-four volt AC power is used by the modules 31-36 for switching a plurality of solenoid actuated valves 62 between ON and OFF states. The twenty-four volt AC power signal from the transformer 58 can also be used by a master module in order to control a pump or master valve (not illustrated). DC power is supplied by the power supply (PS) 64 to the face pack 16 via line 68 that extends within the ribbon cable 29.

Typically the solenoid actuated valves 62 are mounted in subterranean plastic boxes (not illustrated) relatively close to the controller 10, i.e. within one hundred feet of the controller 10. The valves 62 control the supply of pressurized water through subterranean PVC pipes (not illustrated) equipped with risers and sprinklers (not illustrated). As used herein, the term "valve" includes any type of remotely controlled valve useable in an irrigation system. The term "valve" includes valves of the general type in which a solenoid controls a diaphragm type valve. See for example, the valve disclosed in U.S. Pat. No. 6,079,437 granted Jun. 27, 2000 of Beutler et al., assigned to Hunter Industries, Inc. The term "valve" also includes valves in which a pilot valve is not directly opened and closed by a solenoid, e.g hydraulically or pneumatically actuated valves that have a solenoid or its electrical equivalent somewhere in the fluid system, and not necessarily next to the gating valve, for controlling the fluid pressure to open and close the valve.

A suitable electrical port (not illustrated) may be connected to the processor 50 for downloading a watering program that has been created on a personal computer and downloaded into a smart card, portable data shuttle or other removable media (not illustrated). Alternatively, the processor 50 may receive programming and/or commands from a master computer and/or the Internet via hard-wired or wireless connection. The processor 50 could also receive data and commands through a satellite receiver (not illustrated). The programming executed by the processor processor 50 can include a cleaning cycle which momentarily turns on each valve 62 after completion of a run cycle to flush debris away from the valve seat. See the aforementioned U.S. Pat. No. 5,829,678.

The station modules 31-36 (FIG. 4) are configured for insertion into corresponding receptacles in the back panel 14. The station modules 31-36 are connectable to corresponding solenoid actuated valves 62 through dedicated field valve lines 70. The valves 62 are all connected to a common return line 72. The lines 70 and 72 may comprise insulated twelve gauge wires whose stripped ends are secured to the screw terminals of a pair of terminal strips 74 and 76 (FIG. 3) mounted on support structure 46 physically separate and remote from the station modules 31-36.

The station modules 31-36 each include a micro-controller (not illustrated) and at least one switching device, such as a triac (not illustrated) for selectively supplying the twenty four volt AC power signal from the transformer 58 that energizes the corresponding solenoid actuated valve 62. In the example shown, the station modules 31-36 each include four switching devices and can independently control four separate valves 62. Suitable synchronous serial data and asynchronous serial data station module circuits are disclosed in the aforementioned U.S. Pat. No. 6,721,630.

The individual screw terminals of the terminal strips 74 and 76 are connected to individual pins of the male multi-pin electrical connectors 38 so that the triacs of the station modules 62 can selectively apply the twenty-four volt AC signal to the field valve lines 70. In other words, one of the pins in each of the male multi-pin electrical connectors 38 is hard-wired to a corresponding screw terminal of one of the terminal strips 74 and 76. One of the remaining pins of each male multi-pin connector 38 is used to carry power to the corresponding station module circuit from the transformer 58. The remaining pins of each male multi-pin connector 38 are used to establish a communications link between the processor 50 and each of the station modules 31-36.

The terminal strips 74 and 76 could be replaced with a wide variety of terminals. As hereafter used in the claims the term "terminals" encompasses any type of electro-mechanical device suitable for easy and reliable connection and disconnection of the field valve lines 70. Where the field valve lines 70 are wire, such terminals include not only screw and lever type terminals, but many others such as those used on the rear of audio amplifiers, speakers, AC wiring, auto electric systems and so forth. Similarly, the mating multi-pin electrical connectors 30 and 38 could be replaced with a wide variety of other types of mating electrical connectors. As used in the claims the term "connectors" encompasses any type of electro-mechanical devices suitable for rapid connection and disconnection of the station modules, including, but not limited to, multi-pin electrical connectors, card edge connectors and various multiple conductive path male/female plug configurations.

Another terminal strip 78 (FIG. 3) is mounted on support structure 46. The terminal strip 78 provides screw terminals 80 and 82 that allow auxiliary devices to be connected to AC power and a screw terminal 84 for connecting a ground wire. Another terminal strip 86 is mounted on support structure 46 and provides screw terminals 88, 90 and 92 for connecting remote sensor inputs, such as a rain interrupt sensor or an evapotranspiration module, and/or other auxiliary devices (not illustrated). The common return line 72 is connected to one of the screw terminals of either terminal strip 78 or terminal strip 86.

The use of terminals separate from the station modules allows the controller 10 to be re-configured so that the station modules 31-36 can be stacked, i.e. inserted one on top of the other. This allows for a reduction in the overall size of the controller 10. Installation is also simplified since extra field valve lines 70' (FIG. 4) can be connected to terminals, even before the extra station modules, 32-36 for example, are purchased and installed. Service is also simplified since a defective station module can be quickly unplugged and replaced without disturbing or disconnecting any of the wiring to the valves 62.

Figure 5:
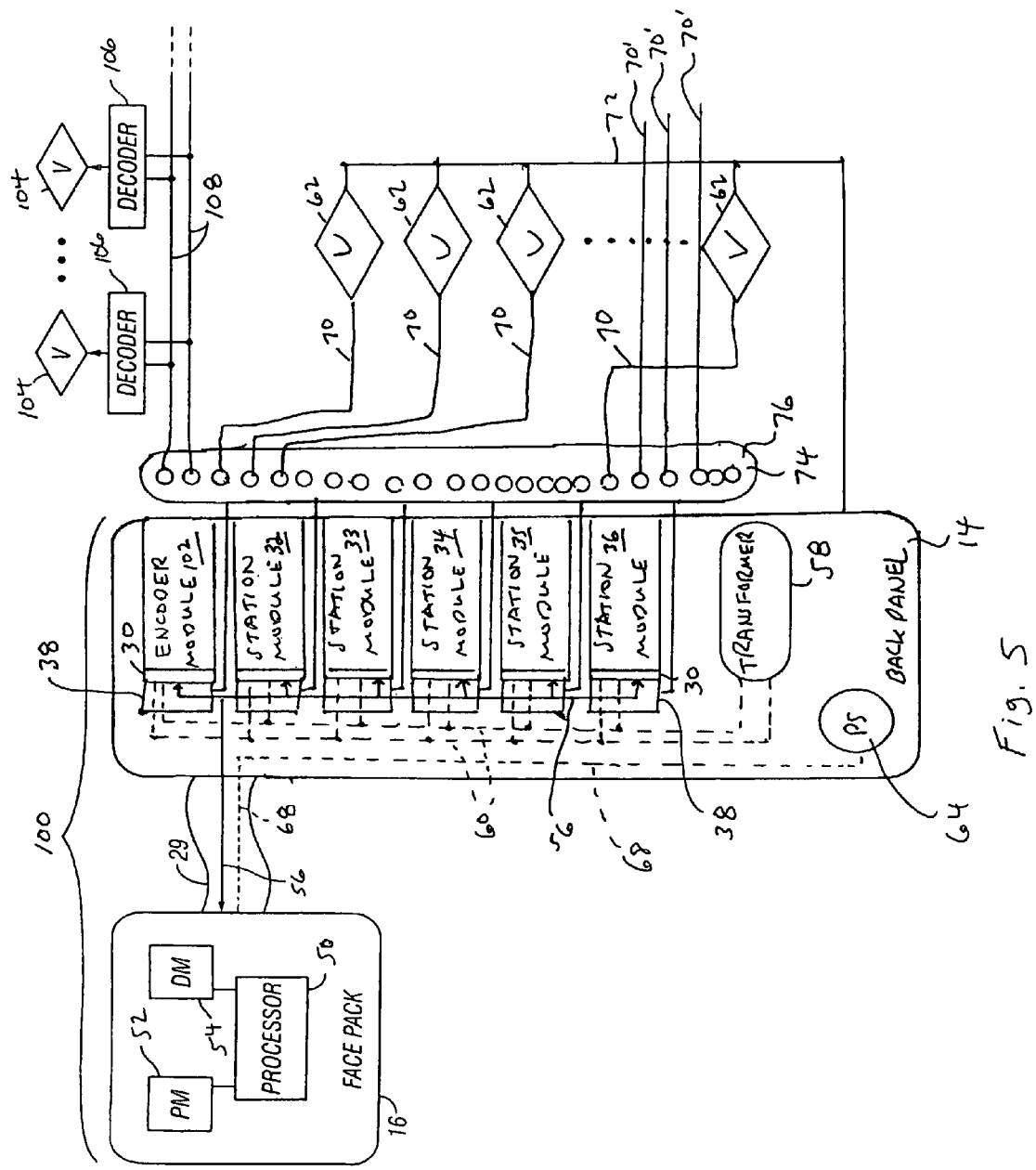
FIG. 5 is a block diagram of an irrigation system including a hybrid modular/decoder irrigation controller.

The system of FIG. 4 can be modified to function as a hybrid modular/decoder controller as disclosed in the aforementioned co-pending U.S. patent application Ser. No. 10/883,283. FIG. 5 is a block diagram of an irrigation system including a hybrid modular/decoder irrigation controller 100. The station module 31 is replaced with an encoder module 102 and some of the valves 104 have decoder circuits 106 so that they can be controlled by the processor 50 over the same pair of field valve lines 108 that together form a common multi-wire path. Just as in the system of FIG. 4, the field valve lines 108 to the valves 104 are attached to one of the terminal strips 74 and 76 separate from the encoder module 102. The field valve lines 108 could be optical fibers since the valves 104 may have local power sources. In such a case the connectors could include fiber optic connectors and opto-electronic couplers to provide communications through the terminal strips 74 and 76 to the processor 50.

While I have described exemplary embodiments of a modular irrigation controllers with separate filed valve line wiring terminals, it will be apparent to those skilled in the art that the invention can be modified in both arrangement and detail. As an example, the controller 10 could be designed to control a predetermined number of valves, e.g. four, without requiring the insertion of any station modules. As another example, the system of FIG. 5 could be modified to eliminate the station modules 32-35 and replace them with encoder modules. Therefore, the protection afforded the invention should only be limited in accordance with the following claims.

I claim:

1. A modular irrigation controller, comprising:
   a processor capable of executing a watering program and controlling at least one station module capable of controlling a plurality of valves in accordance with the watering program;

a plurality of first connectors that can mate to establish a communications link between the station module and the processor;

a plurality of second connectors that can mate to establish a power link between the station module and each one of the valves; and a plurality of terminals each connectable with a corresponding one of a plurality of field valve lines, the terminals being mounted on a support structure and connected to the second connectors, the support structure not being a portion of the station module.

2. The controller of claim 1 and further comprising means connected to the processor for entry or selection of the watering program.

3. The controller of claim 1 and further comprising a memory capable of storing the watering program.

4. The controller of claim 1 wherein the plurality of terminals are screw terminals.

5. The controller of claim 1 wherein the plurality of terminals are provided in the form of a terminal strip.

6. The controller of claim 1 wherein the field valve lines are wires.

7. The controller of claim 1 and further comprising a plurality of receptacles for each removably receiving a corresponding station module.

8. The controller of claim 7 and further comprising a mechanism for locking and unlocking the station modules in the receptacles.

9. The controller of claim 1 wherein the processor is mounted inside a removable face pack.

10. A modular irrigation controller, comprising:

a processor capable of executing a watering program and controlling at least one station module with circuitry that selectively turns a plurality of valves ON and OFF;

a plurality of terminals mounted on a support structure separate from the station module, each terminal being connectable to a corresponding field valve line, the support structure not being a portion of the station module;

a plurality of first connectors that can mate to establish a communication link between the station module and the processor; and a plurality of second connectors that can mate to establish a power link between the station module and corresponding terminals.

11. The controller of claim 10 and further comprising means for entry or selection of the watering program.

12. The controller of claim 10 and further comprising a memory capable of storing the watering program.

13. The controller of claim 10 wherein the terminals are screw terminals.

14. The controller of claim 10 wherein the terminals are part of a terminal strip.

15. The controller of claim 10 wherein the field valve lines are wires.

16. The controller of claim 10 and further comprising a plurality of receptacles for each removably receiving a station module.

17. The controller of claim 16 and further comprising a mechanism for locking and unlocking the station modules in the receptacles.

18. The controller of claim 10 wherein the processor is mounted in a removable face pack.

19. The controller of claim 10 wherein the first and second connectors are selected from the group consisting of multi-pin connectors, card edge connectors and multiple conductive path male/female plug configurations.

* * * * *